United States Patent [19]
Mita et al.

[11] 3,719,705
[45] March 6, 1973

[54] METHOD FOR MANUFACTURING SULFITE PULP COOKING LIQUOR FROM SULFITE PULP SPENT LIQUOR

[75] Inventors: Akio Mita; Toshio Ishida, both of Tokyo, Japan

[73] Assignee: Agency of Industrial Science & Technology, Tokyo, Japan

[22] Filed: Dec. 28, 1970

[21] Appl. No.: 101,984

[30] Foreign Application Priority Data
Jan. 20, 1970 Japan..............................45/5270
Dec. 27, 1969 Japan..............................44/1046

[52] U.S. Cl. ...................423/519, 423/554, 423/555
[51] Int. Cl. ............................C01f 11/46, C01d 5/14
[58] Field of Search........23/130, 131, 132, 133, 122; 423/519, 555, 554

[56] References Cited
UNITED STATES PATENTS 2,010,077  8/1935  Haglund..............................23/130 X
2,800,388  7/1957  Ahlborg et al.......................23/131 X
2,802,791  8/1957  Whitney..............................23/131 X
3,005,686  10/1961 De Haas...............................23/131
3,309,262  3/1967  Copeland et al....................23/131 X

*Primary Examiner*—Edward Stern
*Attorney*—Kurt Kelman

[57] ABSTRACT

Sulfite pulp cooking liquor is produced from sulfite pulp spent liquor by combusting condensed sodium-based spent liquor in an oxidizing atmosphere, adding lime to and blowing sulfur dioxide gas into an aqueous solution of the ash so obtained as to produce an aqueous solution of sodium bisulfite containing calcium sulfate and separating out the calcium sulfate. Alternately, the condensed spent liquor is combusted in a reducing atmosphere, sulfuric acid is added to the resultant smelt to produce an acid solution to which lime is added and into which sulfur dioxide gas is blown and the calcium sulfate produced is separated.

1 Claim, 3 Drawing Figures

METHOD FOR MANUFACTURING SULFITE PULP COOKING LIQUOR FROM SULFITE PULP SPENT LIQUOR

This invention relates to a method for treating sulfite pulp spent liquor (hereinafter referred to as SP spent liquor) thereby reclaim sulfite cooking liquor therefrom and obtaining calcium sulfate as a by-product.

Heretofore, there have been proposed various methods for the utilization of SP spent liquor which is by-produced in large quantities in the production of SP. And, some of these methods have already been reduced to practical use. Yet, it is only a very small portion of the SP spent liquor that is now utilized for the purpose of such reclamation. The bulk of the spent liquor is discarded into rivers and is raising a serious issue of water pollution.

The methods so far proposed and brought to public knowledge include a method (TAPPI: Vol. 40, p 587 (1957) ) whereby SP spent liquor is evaporated and subsequently combusted in a reducing atmosphere to afford a smelt composed predominantly of sodium sulfide and sodium carbonate which smelt is then directly sulfited, a method (TAPPI: Vol. 43, p 699 (1960) ) whereby the smelt is carbonated and the carbonated liquor is further sulfited, and a method (Paper Trade Journal: Vol. 151, pp 38 and 65 (1967) ) whereby the carbonation of smelt is enhanced and sodium bicarbonate obtained consequently in the form of precipitate is separated and further sulfited.

However, these methods involve complicated stages of treatment and the sodium sulfite to be obtained thereby as the end product has a low purity and contains a noticeable amount of sodium thiosulfate, a substance impedimental to the SP cooking. Therefore, these methods are defective in that the product, in its unmodified state, cannot be recycled in the sulfite cooking of wood chip.

From the standpoint of heat balance, it is considered fairly advantageous, to carry out the combustion of the condensed SP spent liquor in an oxidizing atmosphere as it has a larger sulfur content in the dry matter than the kraft pulp spent liquor (hereinafter referred to as KP spent liquor). However, no successful method has ever been developed for reclaiming sulfite cooking liquor from the ashes which are obtained when a spent liquor of a rich ash content, like SP spent liquor, is combusted in a perfectly oxidizing atmosphere.

It is the main object of this invention to provide a method for reclaiming sulfite cooking liquor through complete treatment of SP spent liquor.

The inventors carried out various experiments on the utilization of SP spent liquor. Formerly, they proposed a method for producing sodium sulfate and sodium carbonate from this spent liquor. As a result of further research, they have made the discovery that sodium bisulfite is obtained by sulfiting sodium sulfate and both sodium bisulfite and calcium sulfate are obtained by adding lime to sodium carbonate and sulfiting the resultant mixture as shown by the following formulas:

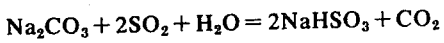

$$Na_2CO_3 + 2SO_2 + H_2O = 2NaHSO_3 + CO_2$$

$$Na_2SO_4 + Ca(OH)_2 + 2SO_2 = 2NaHSO_3 + CaSO_4$$

They have further learned that the resultant sodium bisulfite affords sodium sulfite when it is deprived of calcium sulfate, if any, and then neutralized with sodium hydroxide as shown below:

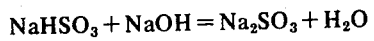
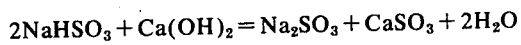

$$NaHSO_3 + NaOH = Na_2SO_3 + H_2O$$

$$2NaHSO_3 + Ca(OH)_2 = Na_2SO_3 + CaSO_3 + 2H_2O$$

Based on the foregoing knowledge, the method of this invention is designed to treat SP spent liquor so as to reclaim sulfite cooking liquor therefrom.

The method is described in detail by referring to the accompanying drawing.

Figure 1:
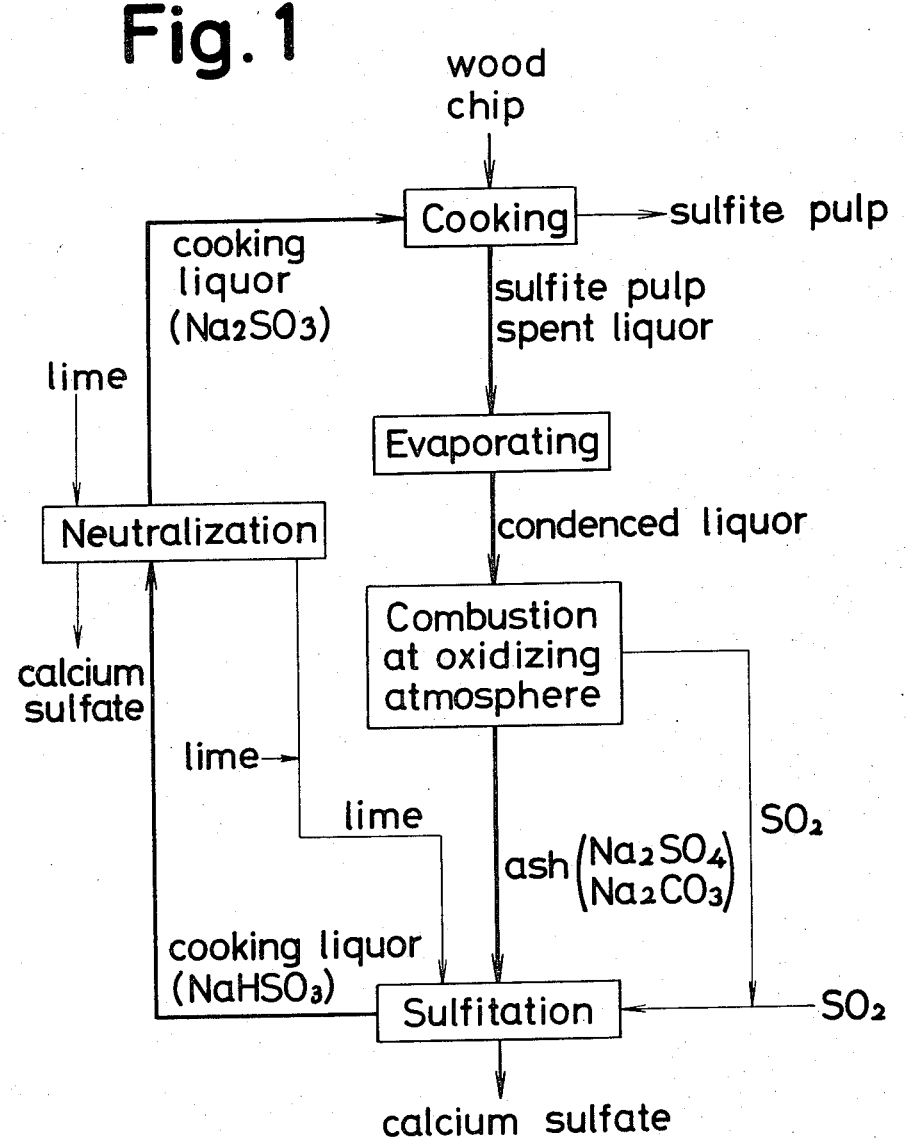
FIG. 1 is a flow sheet illustrating a process of treatment applicable when the SP spent liquor is combusted in an oxidizing atmosphere according to the method of this invention.

Referring now to FIG. 1, wood chips are cooked by an ordinary method and, thereafter, pulp is separated and the SP spent liquor is evaporated to 30 – 55 percent of solids concentration. The present method is applicable to various forms of sodium-based SP spent liquors such as are obtained from acid, neutral, alkali and two-stage cooking processes. Particularly, it is applicable to even the neutral sulfite semichemical pulp spent liquor which has defied satisfactory treatment by conventional methods.

The condensed SP spent liquor is baked at 500° – 600° C for about one hour, if necessary, under a condition of deficient air supply. Although this baking treatment is not a required condition, it serves to facilitate the subsequent treatment of the sulfitation because the sulfur contained in the spent liquor can be eliminated in the form of sulfur dioxide as a result of baking.

The condensed or baked SP spent liquor is then subjected to perfect combustion in an oxidizing atmosphere at 500° – 1500° C.

This treatment combustion effects complete removal of organic matters present in the solids of the SP spent liquor, permitting only inorganic ash to remain. This ash is composed mostly of sodium sulfate and sodium carbonate and contains almost no sodium thiosulfate. This ash is dissolved with water to form its aqueous solution. The mist which is produced in the combustion of KP spent liquor has the same composition and, therefore, can be treated in the same manner. To this aqueous solution, there is added a lime, such as calcium hydroxide, calcium carbonate or calcium sulfite, in the amount of 10 – 30 percent by weight as CaO, based on the weight of the ash present in the solution. Then, sulfur dioxide gas is blown amply into the mixture until the phenomenon of formation of gypsum ceases to occur. In this case, sulfur dioxide which is formed at the stage of baking or at the stage of oxidative combustion can be utilized.

When the reaction is brought to completion, the liquid phase and the precipitate are separated from each other by filtration, centrifugal separation or any other conventional method. The liquid thus separated contains sodium bisulfite and sulfur dioxide gas and, therefore, can be used in its unmodified state as sulfite cooking liquor. Otherwise, it may be neutralized with an alkali such as sodium hydroxide or lime to afford a sulfite cooking liquor containing sodium sulfite.

The precipitate, when dried and calcined at 120° – 150° C, produces a snow-white calcined plaster at nearly a theoretical yield.

Figure 2:
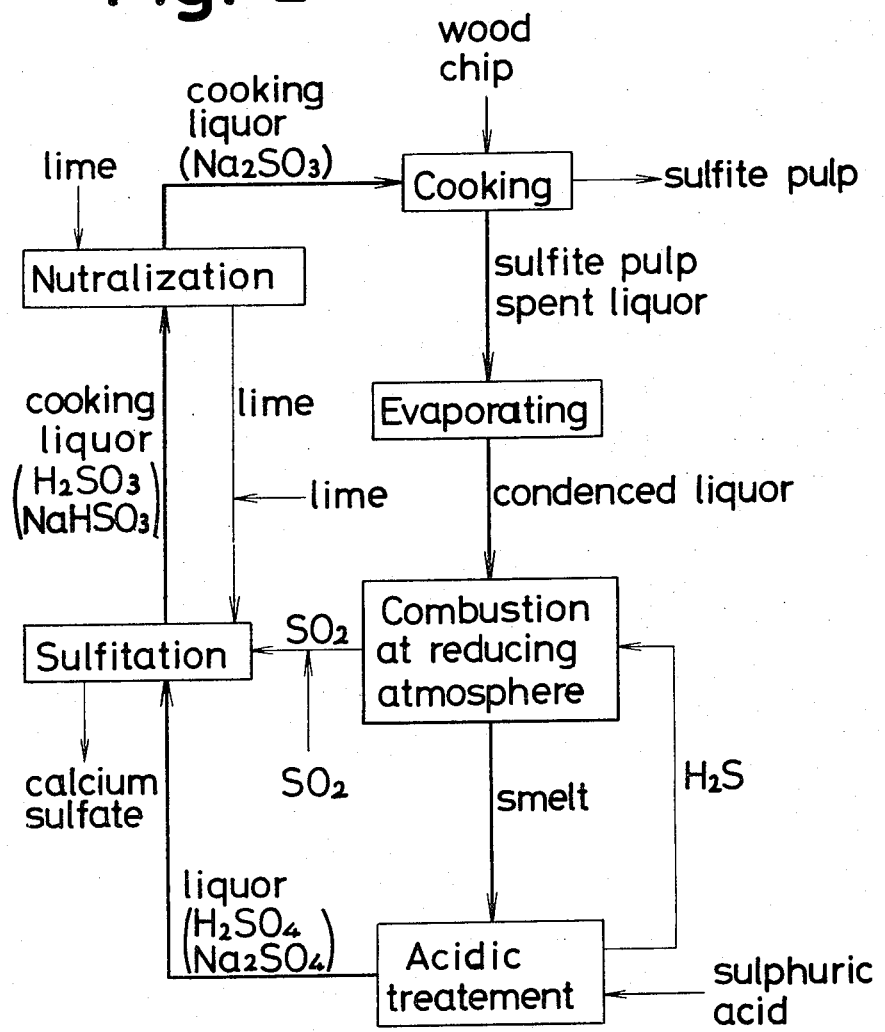
FIG. 2 is a flow sheet illustrating another process of treatment applicable when the SP spent liquor is combusted in a reducing atmosphere according to the method of this invention.

Referring to FIG. 2, the sodium-based SP spent liquor which is obtained after cooking wood chip and separating the pulp is first evaporated to 30 – 55 percent of solids concentration and then combusted in a reducing atmosphere at 920° – 970° C to afford a smelt.

The reducing atmosphere can be obtained by utilizing the organic matter which is a component of the SP spent liquor, the ash which is produced at the time of combustion, and carbon monoxide.

The smelt thus obtained is generally composed of 20 – 35 percent of sodium sulfide, 5 – 20 percent of sodium sulfate, 45 – 55 percent of sodium carbonate, 2 – 5 percent of sodium thiosulfate, 1 – 3 percent of sodium sulfite, 0.1 – 1 percent of silica, and 0.1 – 1 percent of iron. This smelt is dissolved with sulfuric acid to form an acid sulfate solution. In this case, it is appropriate to use sulfuric acid of a concentration of 30 – 75 percent. The spent sulfuric acid (5% $H_2SO_4$ and 10% sodium sulfate) which is produced in the manufacture of viscose rayon, staple fiber or cellophane or the spent sulfuric acid (20% $H_2SO_4$ and 20% $FeSO_4$) which occurs in the manufacture of titanium white or iron can also be used for this purpose.

Where a spent sulfuric acid containing sodium sulfate is used for dissolving the smelt, the dissolution of smelt is accomplished by adding this spent sulfuric acid until the solution becomes acidic. When the solution is acidified with sulfuric acid, the sodium thiosulfate present therein is converted into sodium sulfite as indicated by the following formula. Thus, the sulfite cooking liquor to be obtained will contain almost no sodium thiosulfate.

$$Na_2S_2O_3 = Na_2SO_3 + S$$

This solution is combined with lime added thereto and, thereafter, sulfur dioxide gas is blown amply into the mixture until the formation of new gypsum ceases to occur. As a lime, there may be used calcium hydroxide, calcium carbonate or calcium sulfite. Such lime may contain a considerably larger amount of impurities where the plaster to be produced is not required to be snow-white. In this case, therefore, the carbide residue or similar matter which has to date been discarded as useless can be utilized. The sulfur dioxide which is produced in the aforementioned combustion in the reducing atmosphere can be used here.

On completion of the reaction, the solution is treated by an ordinary method for the separation of the liquid phase from the precipitate.

The liquid thus separated contains sodium bisulfite and sulfur dioxide gas and, therefore, can be used in its unmodified state as sulfite cooking liquor. Otherwise, it may be neutralized with lime to afford a sulfur cooking liquor containing sodium sulfite. The calcium sulfite which is produced at the time of neutralization can be used as a lime component during the sulfitation treatment.

Figure 3:
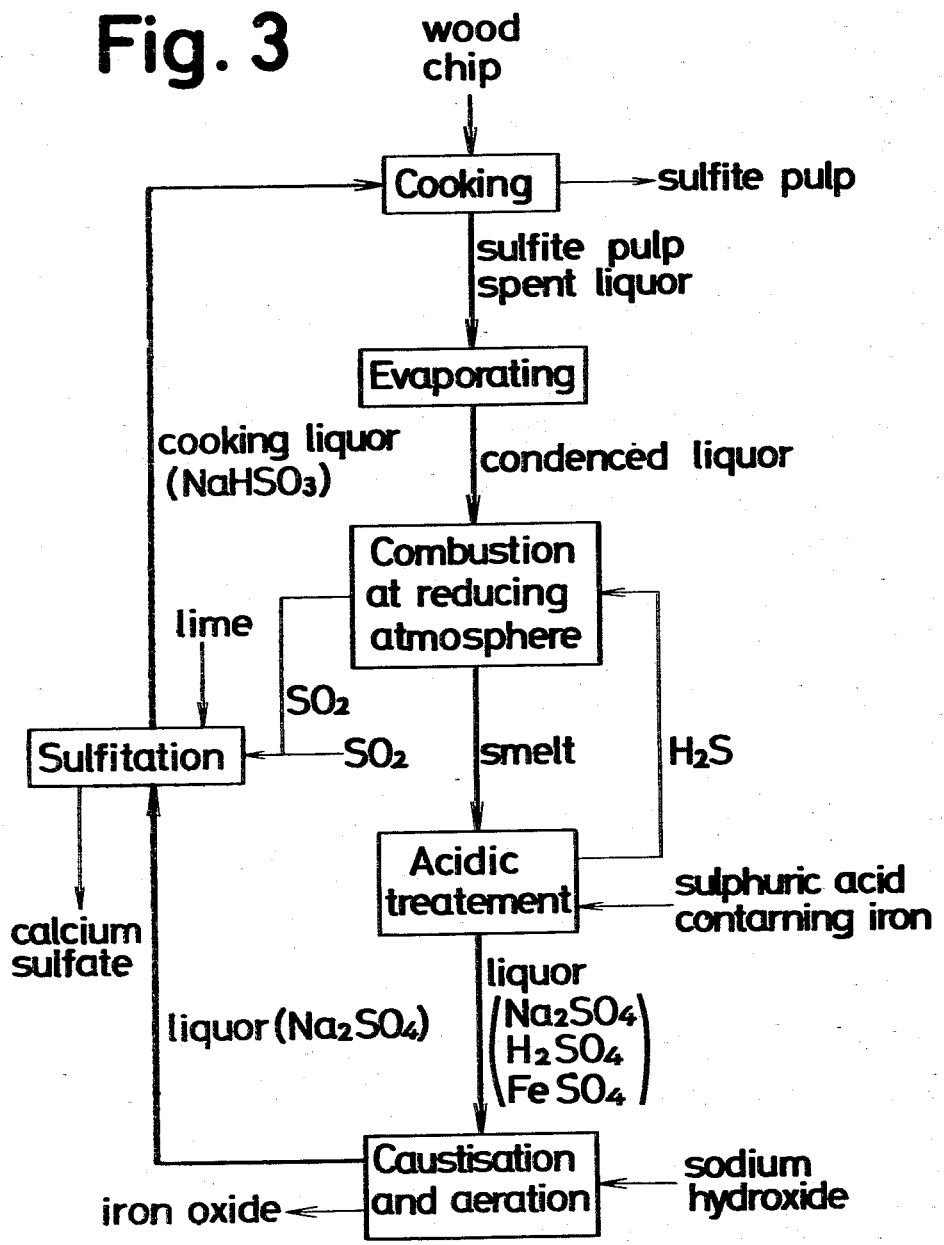
FIG. 3 is a flow sheet illustrating two other examples of the combustion of SP spent liquor in a reducing atmosphere.

The precipitate, when dried and calcined at 120° – 150° C, produces a calcined plaster newly at a theoretical yield.

Where the spent sulfuric acid to be used contains iron, there is followed the procedure illustrated in FIG. 3, which comprises adding the spent sulfuric acid to the smelt until the resultant solution becomes acidic, then alkalinizing the solution by adding thereto such alkali substance as sodium hydroxide or lime, and thereafter, subjecting the solution to air oxidation so as to remove the iron therefrom in the form of iron oxide. In this case, the lime to be used may contain impure substances at a considerably larger concentration. Thus, calcium carbide residue and similar matter may be used for this purpose.

In the same procedure as illustrated in FIG. 2, the separated alkali solution of sodium sulfate is combined with lime added thereto and, then, sulfur dioxide gas is blown into the mixture. The plaster which occurs as a precipitate is removed and the remaining solution is used as sulfite cooking liquor.

By using a procedure far simpler than that of any conventional method, the method of this invention accomplishes perfect treatment of SP spent liquor to reclaim the sulfite cooking liquor and affords a calcined plaster as a by-product. When the SP spent liquor is subjected to the combustion treatment together with KP spent liquor, the mist may be recovered and utilized as sulfite cooking liquor and the smelt as KP cooking liquor respectively.

In the sulfitation treatment, various forms of spent sulfuric acid can be utilized. In this respect, the method of the present invention serves two purposes, i.e., utilization of SP spent liquor and disposal of spent sulfuric acid, at one time. Moreover, use of spent sulfuric acid containing sodium sulfate, such as is obtained from a rayon, staple fiber or cellophase plant, serves to make up for the shortage of sodium component during the recovery of sulfite cooking liquor. Use of spent sulfuric acid containing iron at a fairly high concentration such as is obtained in the production or iron or titanium white results in the by-production of iron oxide of good quality.

Preferred embodiments of this invention are now cited hereinafter. It should be understood that this invention is not limited to these examples.

Example 1

A spent liquor (solids concentration 15.6%, $Na_2O$ 3.12% and S 1.21%) from the sodium-based neutral sulfite semichemical process was evaporated, baked preparatorily at about 530° C and combusted in an oxidizing atmosphere at about 1100° C to afford ash composed chiefly of sodium carbonate and sodium sulfate.

This ash had the following composition:

| Component | Weight percentage |
|---|---|
| $Na_2CO_3$ | 59.6% |
| $Na_2SO_4$ | 38.2% |
| Insoluble matter | 1.22% |
| $Na_2S_2O_3$ | None |

A 20-g portion of the said ash was dissolved in 0.2 liter of water, 3.1 g (as CaO) of slaked lime was added thereto and sulfur dioxide gas was bubbled therethrough to accomplish sulfitation. The precipitate which occurred consequently was separated by filtration to afford a filtrate containing 29.6 g of $NaHSO_3$ and 10.0 g of $SO_2$. This filtrate was found to be usable as a sodium-based bisulfite pulp cooking liquor. The aforementioned precipitate, when dried and calcined at 120° C for two hours, gave rise to 7.04 g of snow-white calcined plaster.

Example 2

A sodium-based SP spent liquor was evaporated to 55 percent of solids concentration and then combusted at furnace-bottom temperature of 950° C to afford a smelt having the following composition.

| Component | Weight percentage |
|---|---|
| $Na_2S$ | 29.0% |
| $Na_2CO_3$ | 49.9% |
| $Na_2CO_4$ | 10.6% |
| $Na_2S_2O_3$ | 3.1% |
| $Na_2SO_3$ | 1.3% |
| $SiO_2$ | 0.2% |
| Fe | 0.2% |

By adding 2130 ml of spent sulfuric acid from cellophane production ($Na_2SO_4$ 120 g/liter, $H_2SO_4$ 56 g/liter) to 100 g of this smelt, there was obtained an acid sulfuric acid solution of crude sulfuric acid (400 g as $Na_2SO_4$). When 243 g of carbide residue (containing 88% of $Ca(OH)_2$) was added to this acid solution and sulfur dioxide gas was then blown into the mixture, there was obtained acid sulfite solution of sodium bisulfite (containing 470 g of $NaHSO_3$ and 298 g of $SO_2$) together with a by-produced calcium sulfate which was isolated for recovery. By neutralizing this solution with 553 g of sodium hydroxide, there was obtained an aqueous solution containing 1157 g of sodium sulfite. When the aforementioned calcium sulfate was heated at 125° C for 3 hours, there was produced 366 g of greyish white calcined plaster.

Example 3

By following the procedure of Example 1, an SP spent liquor was evaporated and combusted to afford a smelt. A 100-g portion of this smelt was dissolved in 400 ml of water and the solution was combined with an iron-containing spent sulfuric acid (containing 96 g of $FeSO_4$ and 107 g of $H_2SO_4$). Consequently, there was obtained a highly concentrated hydrogen sulfide-containing gas (28% of $H_2S$ and 72% of $CO_2$). At the same time, there was obtained an acid aqueous solution of sulfuric acid (pH 2.8) containing sodium sulfate and iron. Then, this acid aqueous solution of sulfuric acid was alkalinized (to pH 8.5) by adding thereto 166 g of sodium hydroxide and, subsequently, oxidized by bubbling air therethrough, so as to permit the existent iron to be removed from the aqueous solution practically quantitatively in the form of iron oxide at nearly the theoretical quantity. After separation of the iron oxide through filtration, there was obtained an alkaline aqueous solution of sodium sulfate (containing 276 g of $Na_2SO_4$ and 1 g of NaOH) as filtrate.

Subsequently, 156 g of calcium hydroxide was added to this alkaline aqueous solution and sulfur dioxide gas was bubbled therethrough. By separating the resultant precipitate of calcium sulfate and then calcining the precipitate at 120°C for about 3 hours, there was obtained 247 g of calcined plaster. The solution which was obtained after removal of calcium sulfate was found to contain 355 g of sodium sulfite, 86 g of sulfur dioxide and a trace of iron and therefore was usable in its unmodified state as SP cooking liquor.

Example 4

By following the procedure of Example 1, SP spent liquor was evaporated and then combusted to afford a smelt. A 100-g portion of this smelt was combined with 2,130 ml of spent sulfuric acid from cellophane production (containing 120 g/liter of $Na_2SO_4$ and 56 g/liter of $H_2SO_4$) and hydrogen sulfide which occurred consequently was recovered. Thus, there was obtained an acid aqueous solution of sodium sulfate (pH 2.5). This aqueous solution contained 392 g of sodium sulfate and 6 g of sulfuric acid. Separately, a mixed solution of calcium bisulfite and sodium bisulfite was prepared by adding crude calcium sulfite to sodium bisulfite, subjecting the mixture to sulfitation and removing the insoluble matter therefrom. This mixed solution was subjected to double decomposition by adding the aforementioned acid aqueous solution of sulfuric acid thereto. The precipitate which occurred in the double decomposition was removed and then thermally decomposed at 120° C to afford 310 g of snow-white calcined plaster. The aqueous solution containing sodium bisulfite resulting from the removal of the precipitate was neutralized with carbide residue added thereto. Subsequent to removal of the crude calcium sulfite produced in the form of precipitate, the neutralized solution was usable as SP cooking liquor (318 g of $Na_2SO_3$ and 0.02 g of iron).

What is claimed is:

1. A method for manufacturing sulfite pulp cooking liquor from sulfite pulp spent liquor, comprising the steps of evaporating a sodium-based pulp spent liquor obtainable after separation of pulp to about 30 – 55 percent of solids concentration, combusting the condensed spent liquor in an oxidizing atmosphere at about 500° – 1100° C, dissolving the resultant ash in water, adding lime to the resultant aqueous solution, subsequently blowing sulfur dioxide gas therein so as to produce an aqueous solution of sodium bisulfite containing calcium sulfate, and separating the said calcium sulfate from the said aqueous solution of sodium bisulfite.

* * * * *